(12) United States Patent
Kim (10) Patent No.: US 7,840,241 B2
(45) Date of Patent: Nov. 23, 2010

(54) SLIDING MODULE FOR PORTABLE TERMINAL

(75) Inventor: Tae-Hyong Kim, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 654 days.

(21) Appl. No.: 11/853,646

(22) Filed: Sep. 11, 2007

(65) Prior Publication Data

US 2008/0062656 A1  Mar. 13, 2008

(30) Foreign Application Priority Data

Sep. 11, 2006  (KR) ...................... 10-2006-0087543

(51) Int. Cl.
*H04B 1/00* (2006.01)
(52) U.S. Cl. .................... 455/575.1; 455/90.3
(58) Field of Classification Search ............. 455/575.1, 455/90.3
See application file for complete search history.

(56) References Cited

U.S. PATENT DOCUMENTS

| | | | |
|---|---|---|---|
| 7,184,806 B2* | 2/2007 | Bae | 455/575.4 |
| 7,363,066 B2* | 4/2008 | Im et al. | 455/575.4 |
| 7,542,788 B2* | 6/2009 | Lee | 455/575.4 |
| 7,660,614 B2* | 2/2010 | Im et al. | 455/575.4 |
| 2005/0009581 A1* | 1/2005 | Im et al. | 455/575.4 |

FOREIGN PATENT DOCUMENTS

| | | |
|---|---|---|
| EP | 1 530 345 | 5/2005 |
| EP | 1 648 145 | 4/2006 |
| WO | WO 2005/091515 | 9/2005 |

\* cited by examiner

*Primary Examiner*—Matthew D Anderson
*Assistant Examiner*—April G Gonzales
(74) *Attorney, Agent, or Firm*—The Farrell Law Firm, LLP (57) ABSTRACT

Disclosed is a sliding module for a portable terminal having a first housing, and a second housing slidably assembled to the first housing to be opposed to the first housing through the sliding module, thereby partially opening or closing the first housing. The sliding module includes a sliding guide mounted on one of the first and second housings; a pair of stopper members mounted on the sliding guide at the opposite ends of the sliding guide, respectively; a pair of sliding members mounted on the other of the first and second housings, the sliding members being slidably engaged with the sliding guide; and a pair of ground members engaged with the sliding members to wrap the sliding members, respectively. When the second housing is located at a position of opening or closing the first housing, the ground members contact the stopper members, thereby being electrically connected with the stopper members.

21 Claims, 10 Drawing Sheets

SLIDING MODULE FOR PORTABLE TERMINAL

PRIORITY

This application claims priority under 35 U.S.C. §119(a) to an application filed in the Korean Industrial Property Office on Sep. 11, 2006 and assigned Serial No. 2006-87543, the contents of which are hereby incorporated by reference.

BACKGROUND OF THE INVENTION

1. Field of the Invention

The present invention relates to a portable terminal, and in particular, to a sliding module for a portable terminal, to which a pair of housings of the portable terminal are slidably assembled.

2. Description of the Related Art

In general, the term "portable terminal" typically means an appliance for providing a mobile communication function to a user. Recently, portable terminals are provided with composite functions so that they can be used not only as mere mobile communication appliances but also as multimedia appliances for reproducing music files, moving image files, etc., or banking service appliances for use in micro payment and mobile banking.

Such a portable terminal is classified into a bar-type terminal, a flip-type terminal or a folder type terminal according to the appearance thereof. Recently, sliding-type terminals have appeared, wherein the sliding-type terminals occupy the majority of the portable terminal market together with folder-type terminals.

A bar-type terminal has a single housing which is provided with a keypad, an input/output apparatus such as a transmitter unit, a display device, and an output apparatus such as a receiver unit. Such a bar-type terminal is advantageous in that its construction is very simple because all the elements enabling the mobile communication function to be executed are provided in a single housing. However, it is necessary to secure a predetermined distance between the transmitter unit and the receiver unit for the purpose of voice communication. Therefore, there is a limit to such a bar-type terminal in terms of miniaturization.

A flip-type terminal is configured by rotatably mounting a flip cover on a bar-type terminal so as to close input devices such as a keypad in a communication standby mode, thereby preventing malfunction. However, there is also a limit to such a flip-type terminal in miniaturization due to the problem of securing a sufficient distance between the transmitter unit and the receiver unit thereof like the bar-type terminal.

A folder-type terminal includes a pair of housings which are foldably coupled to each other. Because input devices and output devices are arranged on the housings, respectively, such a folder-type terminal is advantageous in miniaturization and easy to secure a sufficient distance between the transmitter unit and the receiver unit thereof. As a result, folder-type terminals have occupied most of the portable terminal market for a long time.

A sliding-type portable terminal includes a pair of housings slidably coupled to each other. Because input devices and output devices are arranged on the housings, respectively, and a keypad, which is one of the input devices, is opened or closed as the housings are slid, such a sliding-type portable terminal has several advantages in that the input devices such as the keypad can be protected better, and the portable terminal is easy to use and advantageous in miniaturization. For this reason, sliding-type terminals have gradually gained the folder-type terminals' market share and the market share of sliding-type terminals rather has exceeded that of the folder-type terminals.

As multimedia service and real time broadcasting service using portable terminals have been revitalized, satellite digital multimedia broadcasting and terrestrial digital multimedia broadcasting have been commercialized.

Ordinary mobile communication services, such as voice communication, short message service, mobile internet access, etc., use frequencies in the 800 MHz frequency band or in the 1.8 GHz frequency band. However, satellite digital multimedia broadcasting uses frequencies in the 2.6 GHz frequency band, and terrestrial digital broadcasting uses frequencies in the 174 to 216 MHz frequency band. As a result, in order to receive digital multimedia broadcasting, it is necessary to provide a separate antenna apart from an antenna for use in ordinary mobile communication.

In a sliding-type terminal, however, metallic components configuring the sliding module thereof form a main cause of hindering the action of such an antenna. In addition, an antenna for receiving broadcasting of a low frequency band such as terrestrial digital multimedia broadcasting is not only greatly affected by structures in the neighborhood thereof, but also subjected to abrupt deterioration in performance for receiving terrestrial digital multimedia broadcasting when an electric field or the like is induced between the components of the sliding module due to high frequency noise occurring from the terminal itself, by which the design of such an antenna is restricted.

SUMMARY OF THE INVENTION

Accordingly, the present invention has been made to solve the above-mentioned problems occurring in the prior art, and an aspect of the present invention is to provide a sliding module for a portable terminal, which can reduce influence exerted on an antenna or the like, thereby contributing to an improvement of the performance of the antenna.

Another aspect of the present invention is to provide a sliding module for a portable terminal, which can alleviate a constraint restricting the design of an antenna by reducing influence exerted on the antenna.

In order to accomplish the above-mentioned aspects, there is provided a sliding module for a portable terminal having a first housing, and a second housing slidably assembled to the first housing to be opposed to the first housing through the sliding module, thereby partially opening or closing the first housing, the sliding module including a sliding guide mounted on one of the first and second housings; a pair of stopper members mounted on the sliding guide at the opposite ends of the sliding guide, respectively; a pair of sliding members mounted on the other of the first and second housings, the sliding members being slidably engaged with opposite sides of the sliding guide, respectively; and a pair of ground members engaged with the sliding members in such a manner as to wrap the sliding members, respectively, wherein when the second housing is located at a position of opening or closing the first housing, the ground members get in touch with the stopper members, thereby being electrically connected with the stopper members.

According to another aspect of the present invention, there is provided a sliding module for a portable terminal having a first housing, and a second housing slidably assembled to the first housing to be opposed to the first housing through the sliding module, thereby partially opening or closing the first housing, the sliding module including a sliding guide mounted on one of the first and second housings; a pair of stopper members mounted on the sliding guide at the opposite ends of the sliding guide, respectively; a pair of sliding members mounted on the other of the first and second housings, the sliding members being slidably engaged with opposite sides of the sliding guide, respectively; and a pair of ground members engaged with the sliding members in such a manner as to wrap the sliding members, respectively, wherein when the second housing is located at a position of opening or closing the first housing, the ground members get in touch with the stopper members, thereby being electrically connected with the stopper members, and wherein the sliding guide, the stopper members, the sliding members, and the ground members are formed from a metallic material or at least coated with a metallic material on the surfaces thereof.

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION OF THE PREFERRED EMBODIMENT

Hereinafter, preferred embodiments of the present invention will be described with reference to the accompanying drawings. In the following description, the same elements will be designated by the same reference numerals although they are shown in different drawings.

Figure 1:
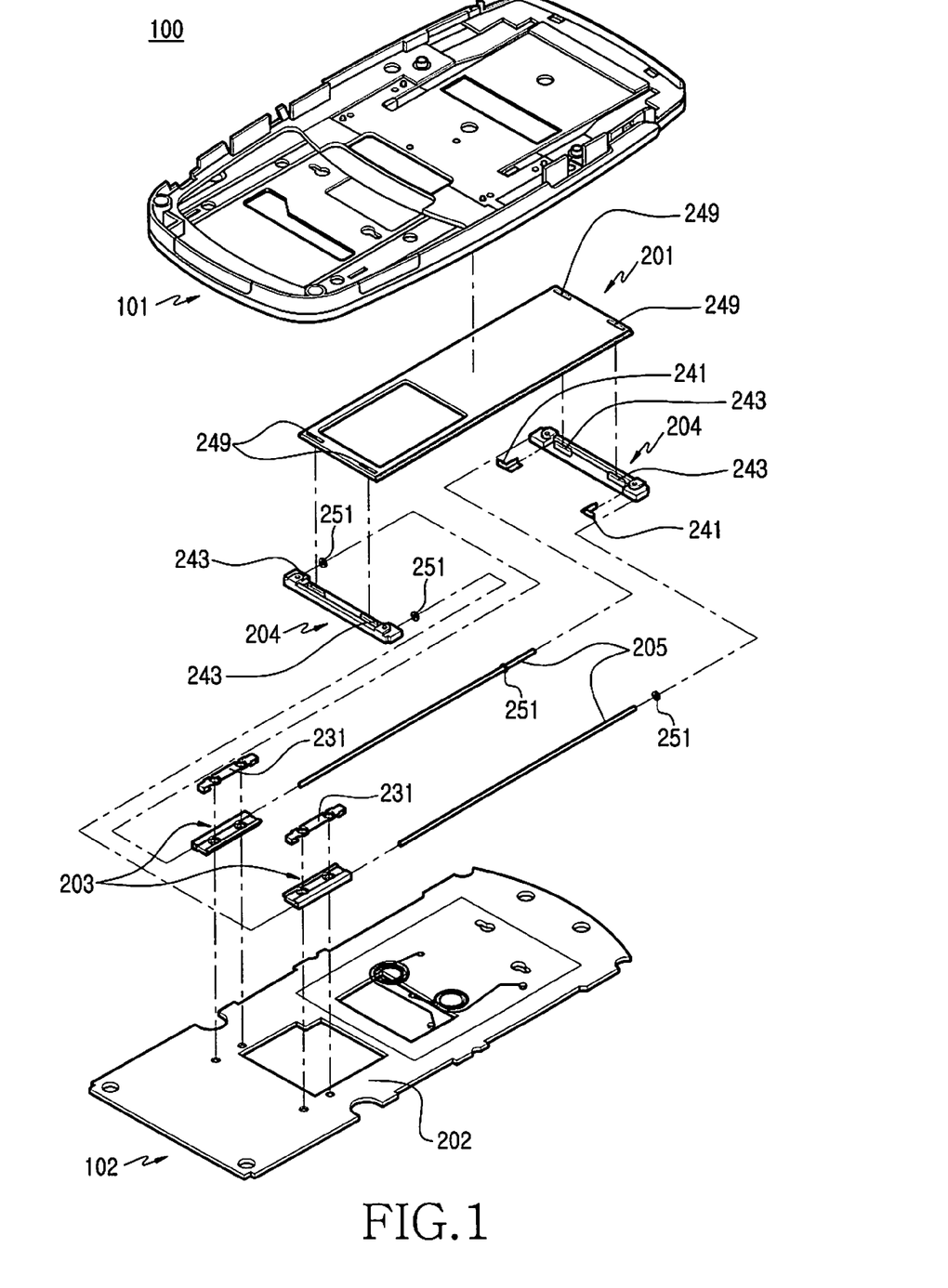
FIG. 1 is an exploded perspective view illustrating a portable terminal with a sliding module according to an embodiment of the present invention.
Figure 2:
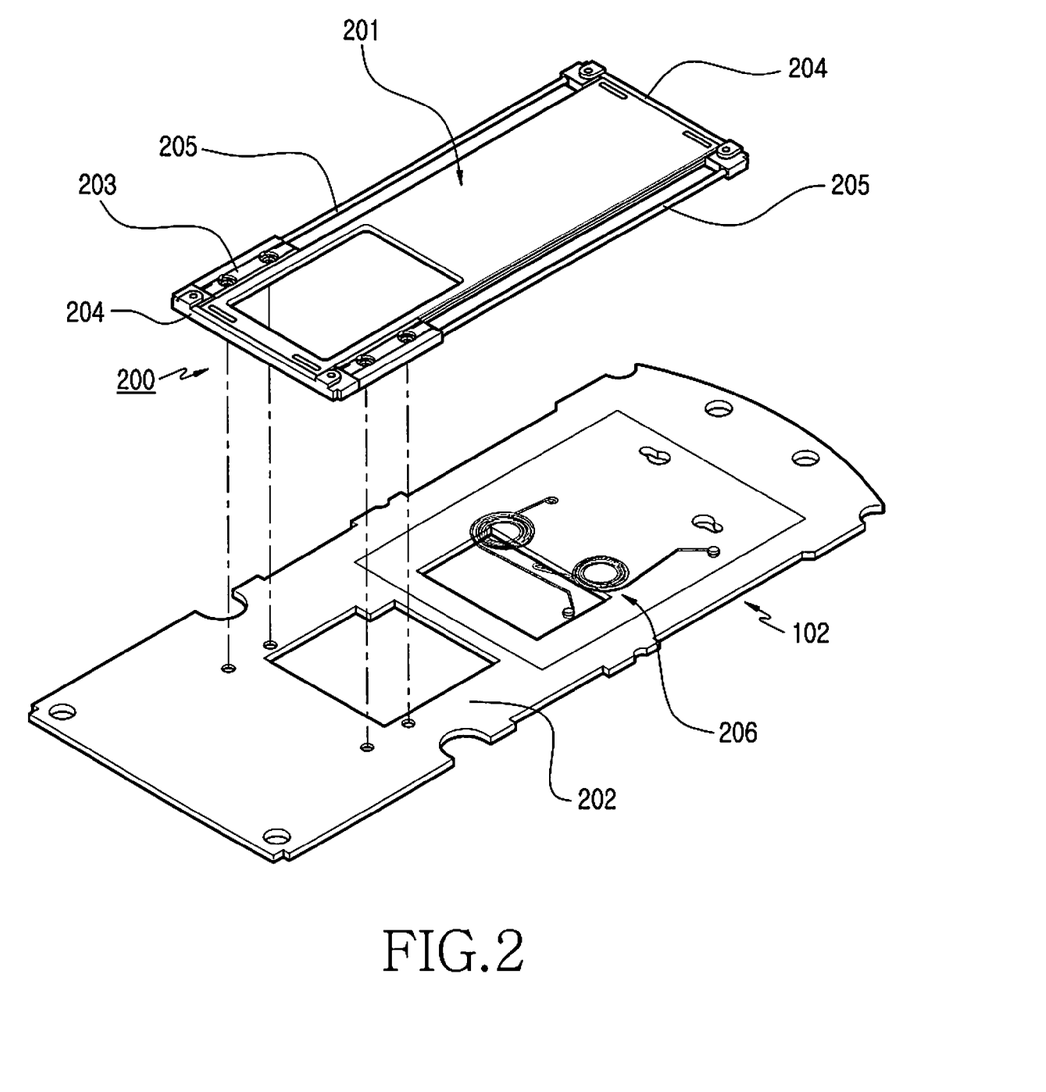
FIG. 2 is an exploded perspective view illustrating how to assemble the sliding module shown in FIG. 1 to a second housing.

As shown in FIGS. 1 and 2, a sliding module 200 according to an embodiment of the present invention includes ground members 231 which allow sliding members 203 to be grounded to a sliding guide 201 when the sliding guide 201 and the sliding members 203 are assembled with each other, wherein the sliding module 200 is interposed between first and second housings 101 and 102 of a portable terminal 100, thereby slidably assembling the second housing 102 to the first housing 101. Here, it should be noted that the first and second housings 101 and 102 are partially shown in FIGS. 1 and 2.

Figure 10:
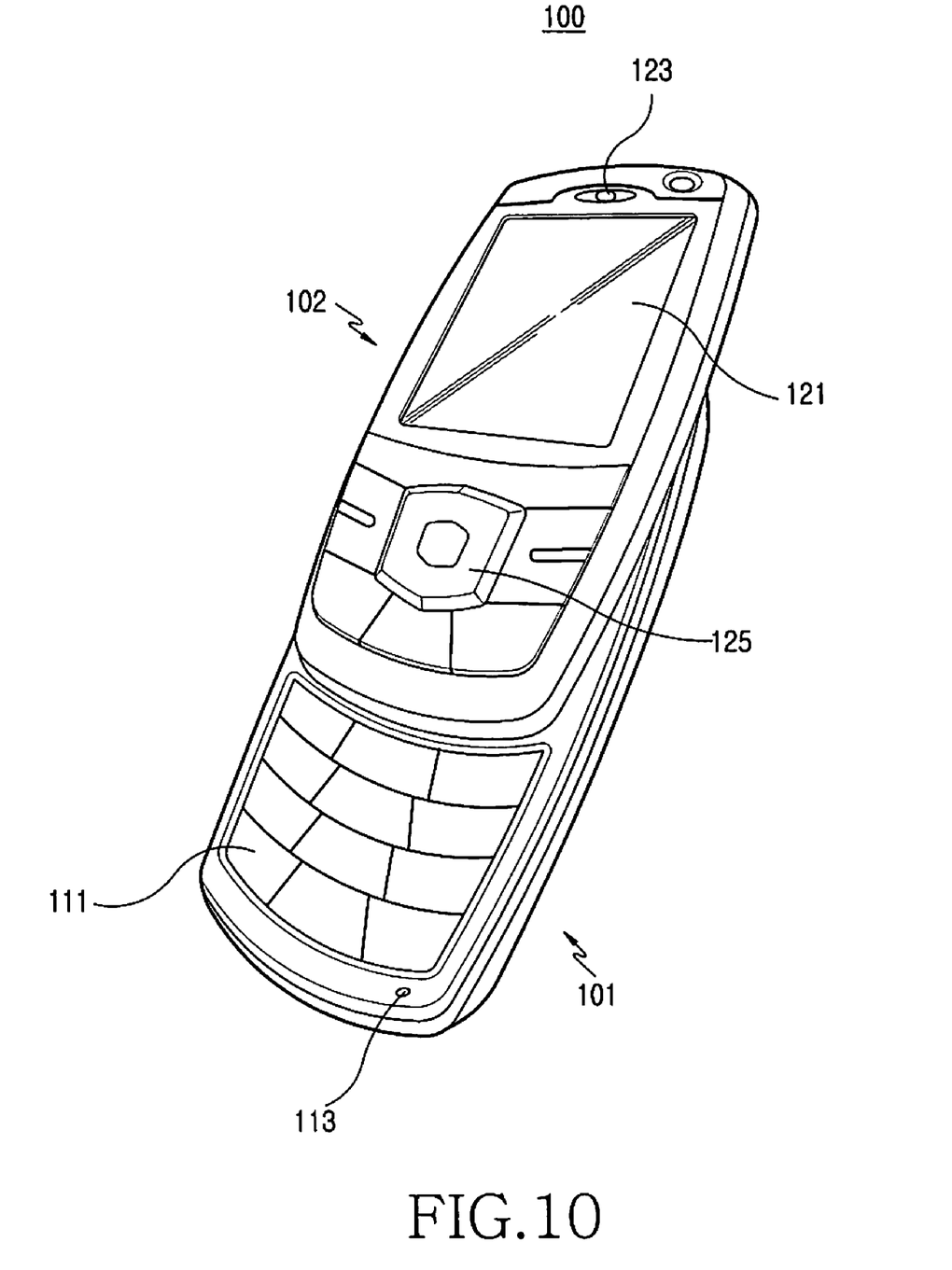
FIG. 10 is a perspective view illustrating a portable terminal having the sliding module shown in FIG. 1.

Referring to FIG. 10, the portable terminal 100 includes a keypad 111 and a transmitter unit 113, which are installed on the first housing 101, and a display device 121, a functional keypad 125, and a receiver unit 123, which are installed on the second housing 102. The keypad 111 and the transmitter unit 113 are opened or closed as the second housing 102 is slid, wherein FIG. 10 shows the keypad 111 and the transmitter unit 113 in the opened state.

In a state in which the first housing 101 is closed, the terminal 100 is set in a communication standby mode, and it is possible to execute a moving image file or to watch and listen to digital multimedia broadcasting by manipulating the functional keypad 125 or a side key not shown in the drawing so that the display device 121 and the receiver unit 123 are activated. In addition, it is possible to enjoy a simple game by using the functional keypad 125.

In a state in which a part of the first housing 101 is opened as shown in FIG. 10, the terminal 100 is set in a communication mode. In this state, it is possible to input various pieces of information, such as a mail message, or to enjoy a game or the like that requires manipulation of various keys.

Turning to FIGS. 1 and 2, the sliding module 200 includes the above-mentioned sliding guide 201 mounted on the first housing 101, and the above-mentioned sliding members 203 mounted on the second housing 102 and slidably assembled to the above-mentioned sliding guide 201, wherein the above-mentioned ground members 231 for grounding the sliding members 203 to the sliding guide 201 are mounted on the sliding members 203. In addition, the above-mentioned stopper members 204 for limiting the sliding movement of the sliding members 203 are mounted on the sliding guide 201, wherein the stopper members 204 are in contact with the ground members 231.

Figure 4:
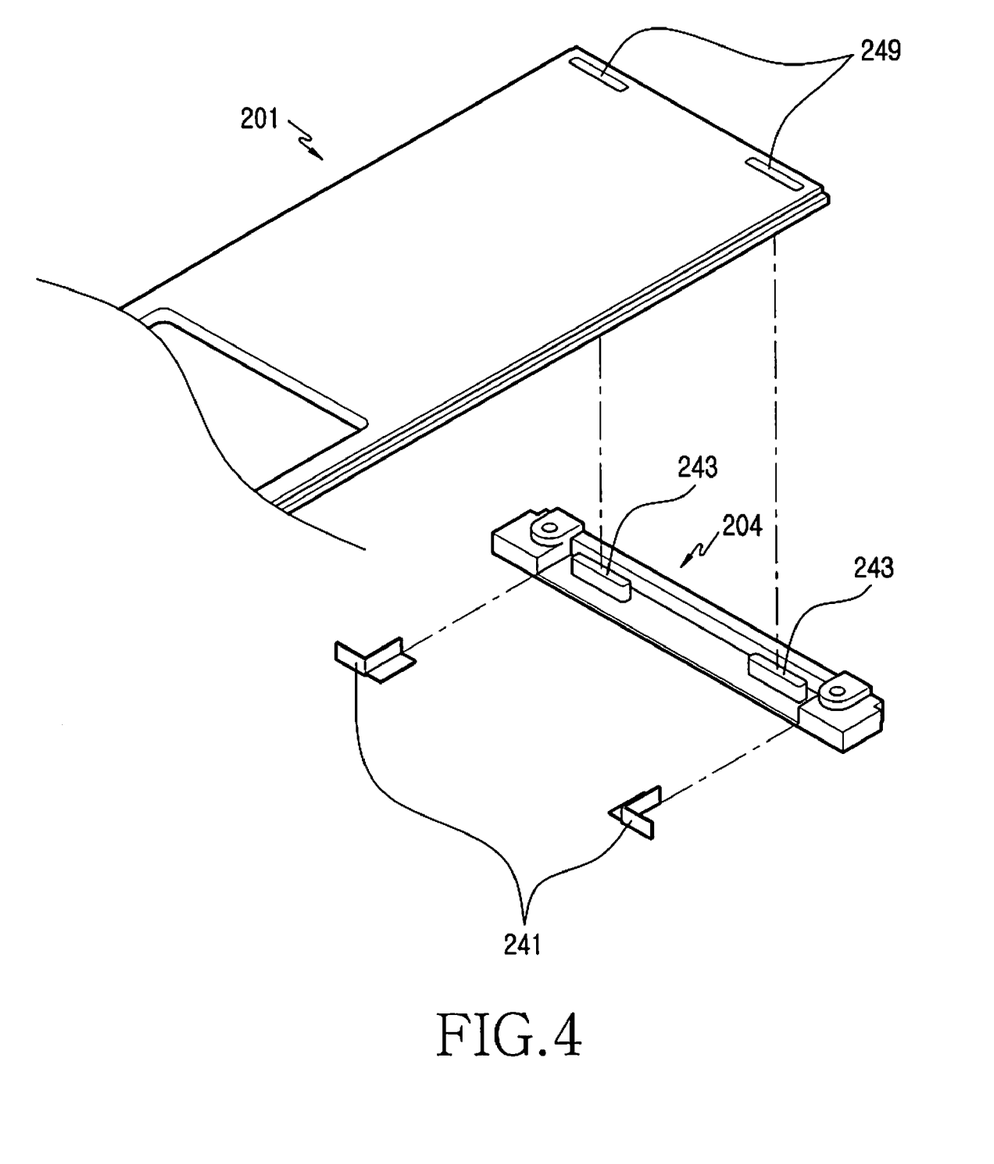
FIG. 4 is an exploded perspective view illustrating how to assemble the stopper members of the sliding module shown in FIG. 1 to a sliding guide.
Figure 5:
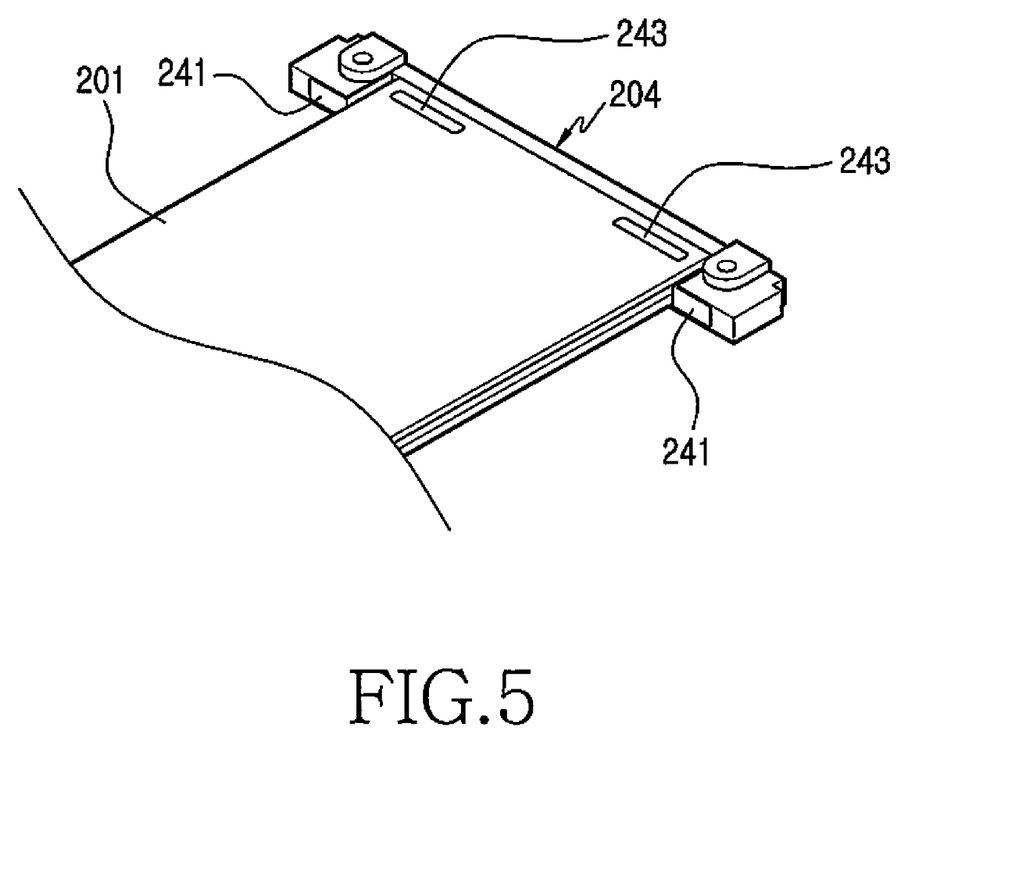
FIG. 5 is a perspective view illustrating the stopper members of the sliding module shown in FIG. 1 assembled to the sliding guide.

Referring to FIGS. 4 and 5, the sliding guide 201 is formed in a flat plate shape extending in the moving direction of the second housing 102, and two pairs of anchoring holes 249 are formed at two opposite ends of the sliding guide 201, respectively, thereby providing means for affixing the stopper members 204.

The stopper members 204 are mounted at the opposite ends of the sliding guide 201, respectively, and the opposite ends of each stopper member 204 project to each of the opposite lateral sides of the sliding guide 201, respectively. At this time, anchoring projections 243 formed on a face of each stopper members 204 are engaged in the anchoring holes 249 by press-fit, respectively, thereby affixing the stopper members 204 to the sliding guide 201.

Each of the stopper members 204 is equipped with a pair of ground plates 241. Each of the ground plates 241 is formed in a shape bent one or more times, wherein a part of each ground plate 241 is received and engaged in the corresponding stopper member 204 and an other part is exposed to a surface of the corresponding stopper member 204. The parts of the stopper members 204 exposed to the surface of the stopper members 204 are positioned at the opposite side edges of the sliding guide 201, respectively, when the stopper members 204 are mounted on the sliding guide 201. At this time, all the stopper members 204 may be equipped with the above-mentioned ground plates 241 and positioned at the opposite ends of the sliding guide 201.

The ground plates 241 serve to provide a ground function and are formed from an electrically conductive material. The sliding guide 201 and the stopper members 204 are also preferably formed from an electrically conductive material.

In the present embodiment, the sliding guide 201 is formed from a material such as Japanese-standard SUS (Stainless Using Steel), wherein the stopper members 204 may be fabricated from a synthetic resin while being coated with copper or gold, so that the stopper members 204 are maintained in an electrically connected state with the sliding guide 201. In addition, the sliding guide 201 is formed from a metallic material so that it is grounded to the first housing 101. Of course, the stopper members 204 may be also formed only from a metallic material.

The sliding members 203 are affixed to the second housing 102 and slidably assembled to the sliding guide 201. The sliding members 203 are assembled to the sliding guide 201 in such a manner as to wrap the opposite side edges of the sliding guide 201, respectively, wherein the sliding members 203 are slid on the sliding guide 201 in such a manner that its movement is limited by being interfered with the stopper members 204 at the opposite ends of the sliding guide 201. Screws (not shown) are used so as to affix the sliding members 203 to the second housing 102, wherein the sliding members 203 may be formed with connection holes for fitting the screws. In addition, the second housing 102 is provided with a sliding plate 202 so as to provide a space for mounting the sliding members 203.

Figure 3:
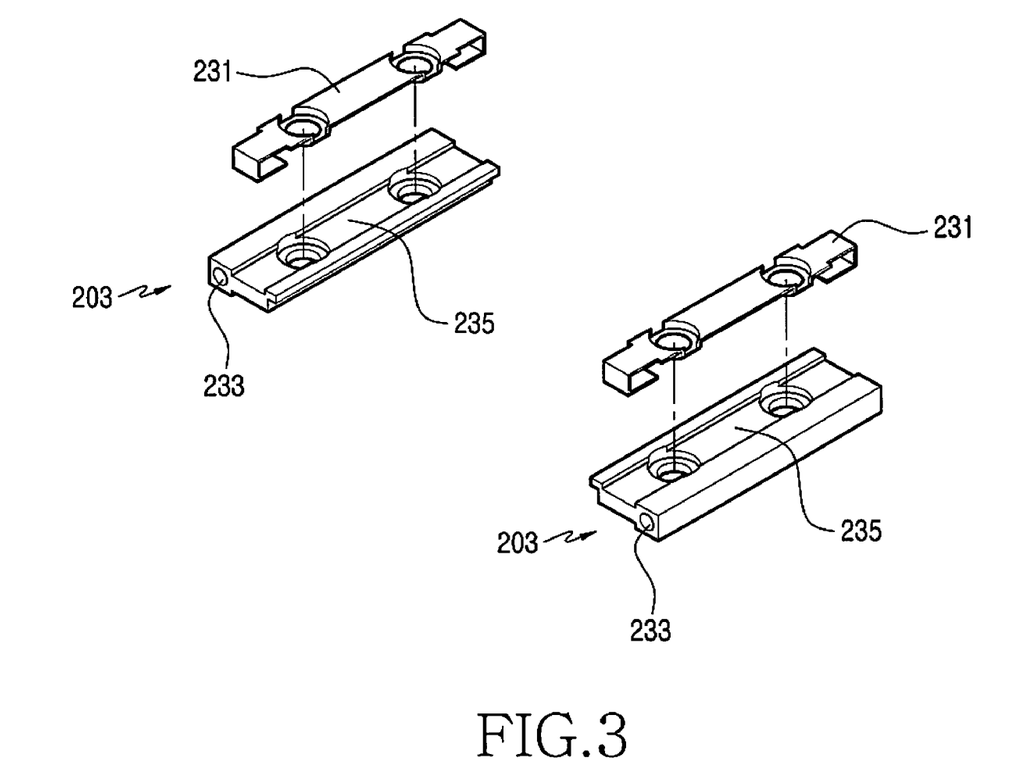
FIG. 3 is an exploded perspective view illustrating how to assemble ground members to the sliding members of the sliding module shown in FIG. 1.

The sliding members 203 may be formed from a metallic material in consideration of endurance or the like, wherein the sliding members 203 are electrically connected to the stopper members 204 through the ground members 231. Referring to FIG. 3, each of the ground members 231 is formed in a shape corresponding to the sliding members 203 by sheet metal working and positioned on a face of each of the sliding members 203 in such a manner that the end portions of the sliding members 203 are wrapped by the ground members 231, respectively. In order to prevent the ground members 231 from projecting to the outside of the sliding members 203, each of the sliding members 203 is formed with connection grooves 235 on the above-mentioned face, which extend in the longitudinal direction of the corresponding sliding member 203. The ground members 231 are engaged with the sliding members 203 by being received in the grooves 235, respectively, wherein the opposite end portions of each ground member 231 are bent so as to wrap the opposite end portions of a corresponding sliding member 203.

Meanwhile, the screws for affixing the sliding members 203 to the second housing 102 may affix the ground members 231 to the sliding members 203. That is, the screws for affixing the sliding members 203 to the second housing 102 sequentially pass through the ground members 231 and the sliding members 203 and are anchored to the second housing 102.

As the sliding members 203 are slidably assembled to the sliding guide 201 in such a manner as to wrap the opposite side edges of the sliding guide 201 in a state in which they are mounted on the second housing 102, the second housing 102 is slidably assembled to the first housing 101.

Meanwhile, the sliding module 200 includes guide shafts 205 so as to stably maintain the rectilinear movement of the sliding members 203. The guide shafts 205 are affixed to the stopper members 204 at the opposite ends thereof. More specifically, the guide shafts 205 are affected to the opposite ends of the stopper members 204 projecting to the opposite lateral sides of the sliding guide 201, thereby being kept to be spaced from the opposite side edges of the sliding guide 201.

Figure 6:
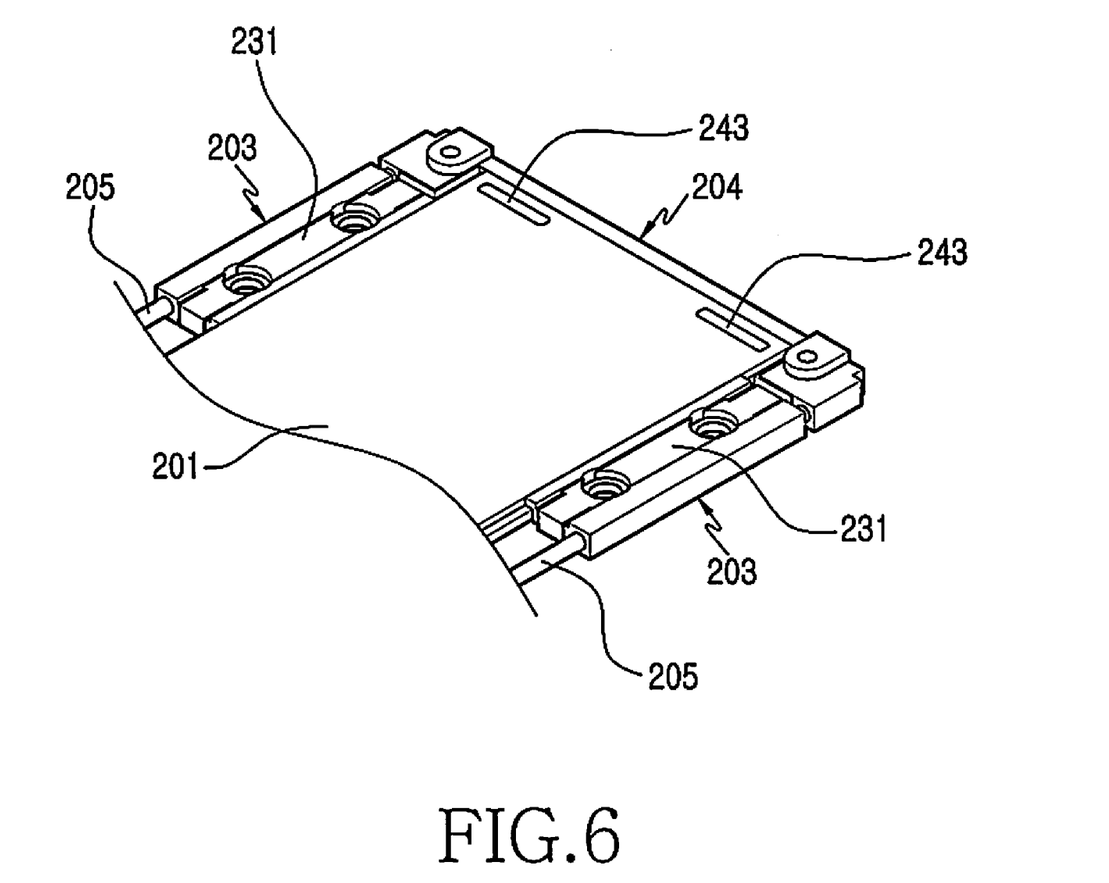
FIG. 6 is a perspective view illustrating the sliding members of the sliding module shown in FIG. 1 assembled to the sliding guide.
Figure 7:
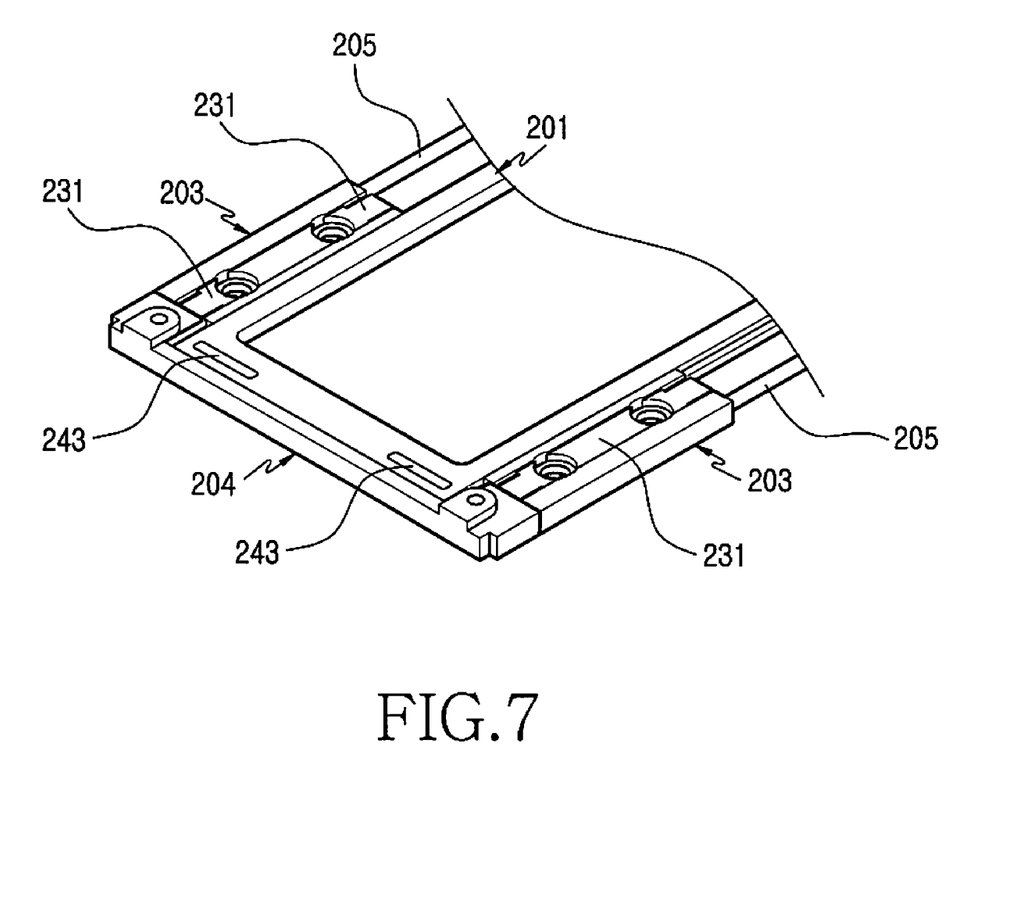
FIG. 7 is a perspective view illustrating the sliding members of the sliding module moved on the sliding guides from the position shown in FIG. 6.

Each of the sliding members 203 is formed with a sliding bore 233 (see FIG. 3) extending through the sliding member in the longitudinal direction, and the guide shafts 205 are inserted into the sliding bores 233, respectively, in such a manner that the sliding members 203 are slidable along the guide shafts 205, respectively. Consequently, the sliding members 203 are engaged to the sliding guide 201 in such a manner as to wrap the opposite side edges of the sliding guide 201 and supported by the guide shafts 205, respectively, thereby performing sliding movement. FIGS. 6 and 7 show the sliding members 203 in the states in which the sliding members contact the top and bottom stopper members 204 by being slid on the sliding guide 201, respectively.

At a position where the second housing 102 opens or closes the first housing 101, the ground members 231 contact the top or bottom stopper members 204, respectively. In particular, at the position where the first housing 101 is opened, the ground members 231 contact the ground plates 241, respectively. Therefore, at the position where the first housing 101 is opened, the sliding members 203 can be grounded to the first housing 101 through the ground members 231, the top stopper member 204, and the sliding guide 201. Likewise, since the ground plates 241 are installed on both of the stopper members 204 at the opposite ends of the sliding guide 201, the ground members 231 installed on the sliding members 203 can also contact the ground plates 241.

Figure 8:
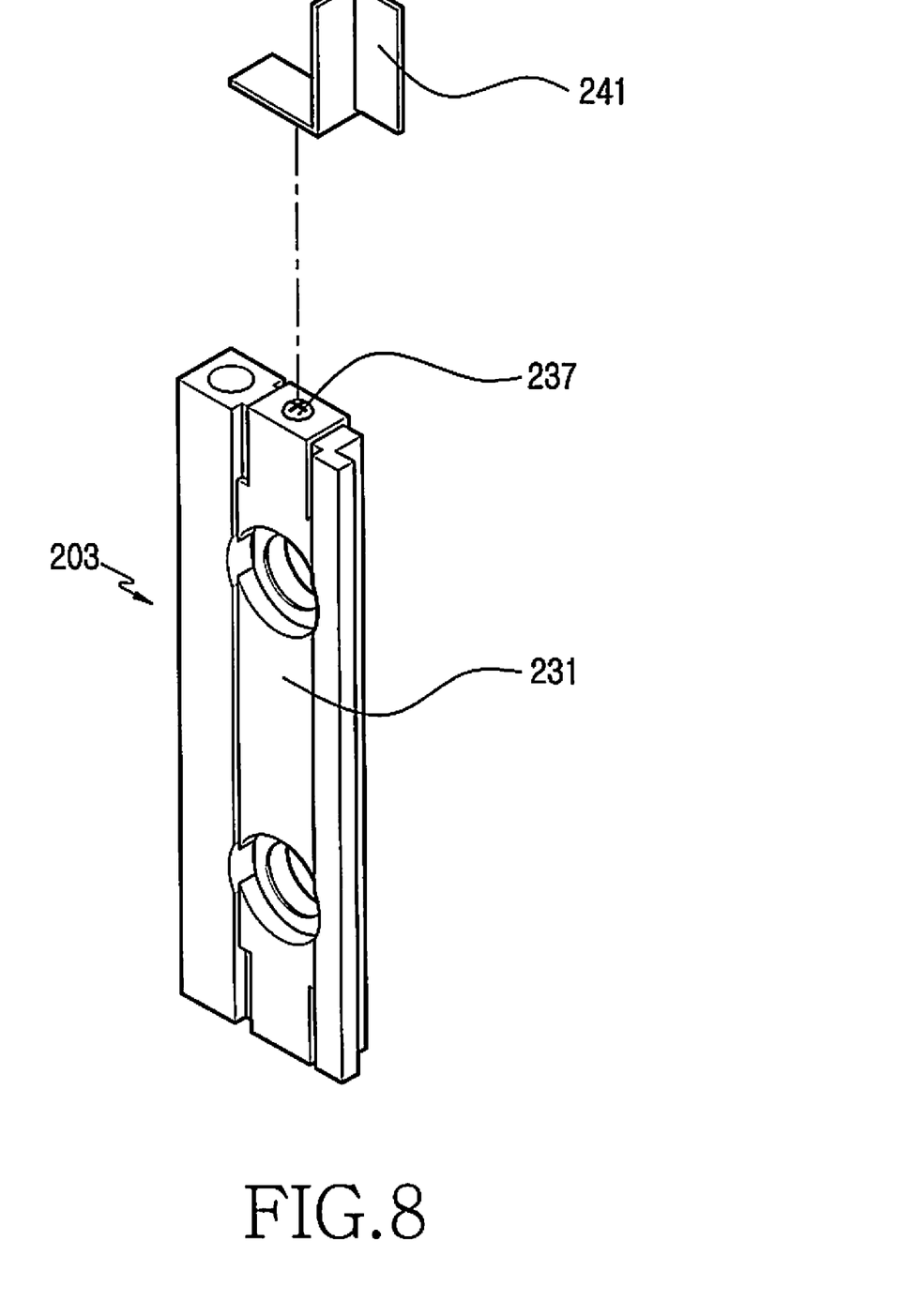
FIG. 8 is a perspective view illustrating electrically conductive dampers provided on the ground members shown in FIG. 1.
Figure 9:
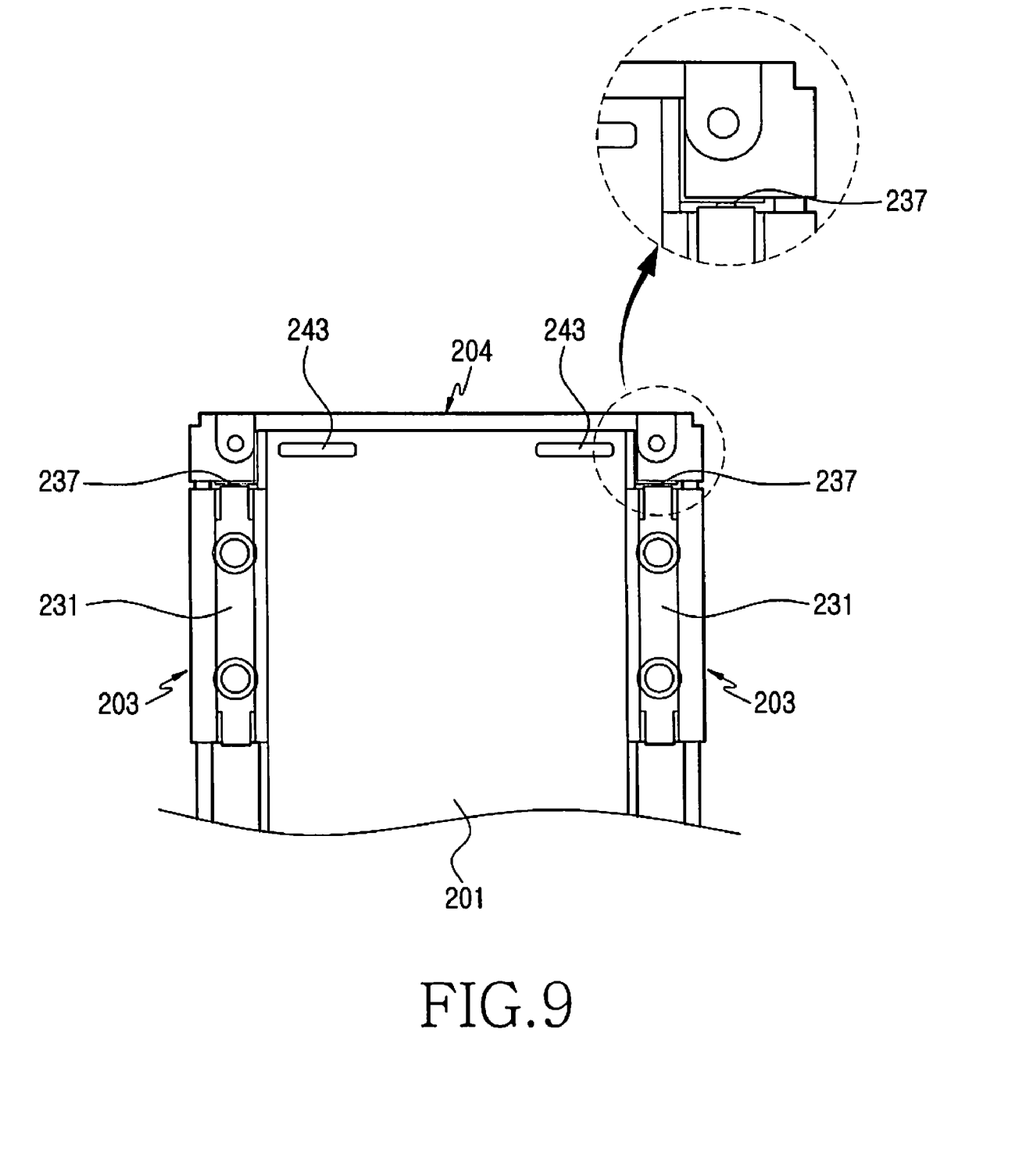
FIG. 9 is a top plan view illustrating the electrically conductive dampers shown in FIG. 8, which electrically contact the ground plates.

Referring to FIGS. 8 and 9, in order to stably maintain the contact between the ground members 231 and the ground plates 241, the ground members 231 may be provided with electrically conductive dampers 237, respectively. Each of the ground members 231 is provided with such an electrically conductive damper 237 at one end thereof. As a result, such an electrically conductive damper 237 is provided at one end of each of the sliding members 203, so that the electrically conductive dampers 237 contact the ground plate 241 when the sliding members 203 are positioned at one end of the sliding guide 201.

In the present embodiment, it is explained that an electrically conductive damper 237 is provided at one end of each ground member 231 by way of an example. However, each of the ground members 231 may be provided with electrically conductive dampers at both ends thereof, and each of the stopper members 204 is equipped with ground plates 241, so that all the ground members 231 can be stably connected to the ground plates 241 and eventually to the stopper members when the first housing 101 is either closed or opened.

Referring to FIG. 2, the sliding module 200 may include elastic means 206 to provide driving force for sliding the second housing. The elastic means 206 provides elastic force action in the direction in which the opposite ends of the elastic means are spaced away from each other, wherein the elastic means 206 is provided in such a manner that within the range of sliding movement of the second housing 102, there is a position at which the opposite ends of the elastic means 206 are most closely adjacent to each other. In the present embodiment, the elastic means 206 is formed from a pair of torsion springs, each of which includes a coil and free ends extend away from the opposite ends of the coil, wherein the free ends are supported by the sliding guide 201 and the second housing 102, respectively.

Although the present embodiment discloses a sliding module 200, to which elastic means 206 employing torsion springs is applied, the sliding module 200 may employ another type of elastic means. For example, it is possible for the sliding module 200 to employ wire springs, each extending in a zigzag form and accumulating elastic force acting in the direction in which the opposite ends thereof are spaced away from each other.

The second housing 102 receives driving force from the elastic means 206 acting in the direction for closing or opening the first housing 101, depending on the slid position thereof. For example, if the second housing 102 is positioned between a closing position at which the second housing closes the first housing 101 and an intermediate position at which the opposite ends of the elastic means 206 are most closely adjacent to each other, the elastic force of the elastic means 206 is converted into closing force acting in the direction for closing the first housing 101. In addition, if the second housing 102 is positioned between an opening position at which the second housing 102 opens the first housing 101 and the intermediate position, the elastic force of the elastic means 206 is converted into opening force acting in the direction for opening the first housing 101.

Therefore, if the user moves the second housing 102 to slide over a first part of a moving section for opening or closing the first housing 101, the elastic force of the elastic means 206 will move the second housing 102 to slide over the remaining part of the moving section.

As the second housing 102 is driven by the elastic force of the elastic member 206, impact and noise occur at the first moment the sliding members 203 contact the stopper members 204. In order to alleviate such impact and noise, the opposite ends of the guide shafts 205 are provided with impact dampers 251, respectively. Referring to FIG. 1, the impact dampers 251 are fitted on the guide shafts 205, respectively, wherein the impact dampers 251 are preferably formed from an impact-absorbent material such as urethane or silicon.

As the impact dampers 251 are provided on the guide shafts 205, respectively, when the second housing 102 opens or closes the first housing 101, the impact dampers 251 are interposed between the sliding members 203 and a corresponding stopper member 204. As the impact dampers 251 are interposed between the sliding members 203 and the corresponding stopper member 204, it is possible to alleviate the impact or noise occurring at the final moment of opening or closing the first housing 101.

The sliding module 200 configured as described above is grounded to the first housing 101 through the ground members 231, the stopper members 204 and the sliding guide 201 simultaneously when the sliding guide 201 is assembled to the second housing 102 through the sliding plate 202. In addition, as the first and second housing 101 and 102 are grounded to each other through the sliding module, grounding can be smoothly and reliably provided even if high frequencies of different characteristics are produced by the action of circuit devices housed within each of the first and second housings 101 and 102.

As described above, the inventive sliding module for a portable terminal can prevent the components of the sliding module or the portable terminal from affecting the action of the antenna of the portable terminal by grounding the respective components to the housings of the terminal. As a result, it is possible to implement the stable action of the antenna and to alleviate constraints restricting the design of the antenna.

While the invention has been shown and described with reference to certain preferred embodiments thereof, it will be understood by those skilled in the art that various changes in form and details may be made therein without departing from the spirit. For example, although in the embodiments described above, it was described that the sliding guide 201 and the sliding members 203 are mounted on the first housing 101 and on the second housing 102 by way of an example, it is possible to mount the sliding members 203 and the sliding guide 201 on the first housing 101 and the second housing 102, respectively. It should be appreciated that the scope of the invention is determined by the appended claims rather than by the embodiments described above.

What is claimed is:

1. A sliding module for a portable terminal having a first housing, and a second housing slidably assembled to the first housing and opposed to the first housing through the sliding module, thereby partially opening or closing the first housing, the sliding module comprising:
   a sliding guide mounted on one of the first and second housings;
   a pair of stopper members mounted on the sliding guide at opposite ends of the sliding guide, respectively;
   a pair of sliding members mounted on the other of the first and second housings, the sliding members being slidably engaged with opposite longitudinal sides of the sliding guide, respectively; and
   a pair of ground members engaged with the sliding members in such a manner as to wrap the sliding members, respectively,
   wherein when the second housing is located at one of opening and closing positions with respect to the first housing, the ground members electrically contact the stopper members.

2. A sliding module as claimed in claim 1, wherein the sliding guide is formed of stainless steel and the stopper members are coated with copper or gold.

3. A sliding module as claimed in claim 1, further comprising ground plates mounted on an outer surface of each of the stopper members in an exposed state, wherein the ground members electrically contact one of the ground plates when the second housing is located at one of the opening and closing positions.

4. A sliding module as claimed in claim 1, further comprising:
   anchoring holes formed at the opposite ends of the sliding guide; and
   anchoring projections formed on a surface of each of the stopper members,
   wherein the anchoring projections are press-fitted to the anchoring holes, respectively, the stopper members being anchored to the sliding guide.

5. A sliding module as claimed in claim 1, further comprising connection grooves, each formed on an outer surface of each of the sliding members in a longitudinal direction of the sliding members,
   wherein the ground members are positioned within the connection grooves, respectively, in a state in which opposite ends of each ground member wrap opposite ends of a corresponding sliding member.

6. A sliding module as claimed in claim 5, further comprising screws sequentially passing through the ground members and the sliding members and anchoring the ground members and the sliding members to the other of the first and second housings.

7. A sliding module as claimed in claim 1, further comprising:
   a pair of guide shafts provided at the opposite longitudinal sides of the sliding guide, opposite ends of the guide shafts being assembled to the stopper members, respectively; and
   a pair of sliding bores formed in the longitudinal direction through the sliding members, respectively,
   wherein the guide shafts are fitted in the sliding bores, respectively, in such a manner that the guide shafts are slidable through the sliding bores.

8. A sliding module as claimed in claim 7, further comprising impact dampers provided at the opposite ends of each of the guide shafts, wherein the impact dampers are interposed between one of the stopper member and the sliding member when the second housing is located at one of the opening and closing positions.

9. A sliding module as claimed in claim 1, further comprising electrically conductive dampers formed from electrically conductive silicon rubber, each of the electrically conductive dampers being mounted on at least one end of one of the ground members to project outward, wherein the electrically conductive dampers are electrically connected with one of the stopper members when the second housing is located at one of the opening and closing positions.

10. A sliding module as claimed in claim 9, further comprising ground plates mounted on an outer surface of each of the stopper members in an exposed state, wherein the electrically conductive dampers contact the ground plates, thereby being electrically connected to one of the stopper members when the second housing is located at one of the opening and closing positions.

11. A sliding module as claimed in claim 1, wherein the sliding members are grounded to one of the first and second housings through the ground members, the stopper members, and the sliding guide.

12. A sliding module as claimed in claim 1, further comprising elastic means, one end of which is supported by the sliding guide and the other end of which is supported by the other of the first and second housings, the elastic means providing elastic force acting in a direction in which the opposite ends of the elastic means are spaced away from each other, wherein within a range of a sliding movement of the second housing, there is a position at which the opposite ends of the elastic means are most closely adjacent to each other.

13. A sliding module as claimed in claim 12, wherein the elastic means comprises a coil spring, and a pair of free ends extending from the opposite ends of the coil spring in a direction away from each other.

14. A sliding module as claimed in claim 1, wherein the first and second housings are grounded to each other through the sliding guide, the stopper members, the ground members, and the sliding members.

15. A sliding module for a portable terminal having a first housing, and a second housing slidably assembled to the first housing and opposed to the first housing through the sliding module, thereby partially opening or closing the first housing, the sliding module comprising:

a sliding guide mounted on one of the first and second housings;

a pair of stopper members mounted on the sliding guide at opposite ends of the sliding guide, respectively;

a pair of sliding members mounted on the other of the first and second housings, the sliding members being slidably engaged with opposite longitudinal sides of the sliding guide, respectively; and a pair of ground members engaged with the sliding members in such a manner as to wrap the sliding members, respectively, wherein, when the second housing is located at one of opening and closing positions with respect to the first housing, the ground members electrically contact the stopper members, thereby being electrically connected with the stopper members, and wherein the sliding guide, the stopper members, the sliding members, and the ground members are formed from a metallic material or at least coated with a metallic material.

16. A sliding module as claimed in claim 15, wherein the first and second housings are grounded to each other through the sliding guide, the stopper members, the ground members, and the sliding members.

17. A sliding module as claimed in claim 15, further comprising electrically conductive dampers formed from silicon rubber, each of the electrically conductive dampers being mounted on at least one end of one of the ground members to project outward, wherein the electrically conductive dampers are electrically connected with one of the stopper members when the second housing is located at one of the opening and closing positions.

18. A sliding module as claimed in claim 15, further comprising ground plates mounted on an outer surface of each of the stopper members in an exposed state, wherein the electrically conductive dampers contact the ground plates, thereby being electrically connected to one of the stopper members when the housing is located at one of the opening and closing positions.

19. A sliding module as claimed in claim 15, further comprising:

a pair of guide shafts provided at the opposite longitudinal sides of the sliding guide, opposite ends of the guide shafts being assembled to the stopper members, respectively; and a pair of sliding bores formed in a longitudinal direction of the sliding members and through the sliding members, respectively, wherein the guide shafts are fitted in the sliding bores, respectively, in such a manner that the guide shafts are slidable through the sliding bores.

20. A sliding module as claimed in claim 19, further comprising elastic means, one end of which is supported by the sliding guide and the other end of which is supported by the other of the first and second housings, the elastic means providing elastic force acting in a direction in which the opposite ends of the elastic means are spaced away from each other, wherein within a range of a sliding movement of the second housing, there is a position at which opposite ends of the elastic means are most closely adjacent to each other.

21. A sliding module as claimed in claim 15, further comprising electrically conductive dampers formed from electrically conductive silicon rubber, each of the electrically conductive dampers being mounted on at least one end of one of the ground members to project outward, wherein the electrically conductive dampers electrically contact one of the stopper members when the second housing is located at one of the opening and closing positions.

* * * * *